US006960875B2

(12) United States Patent
Morimoto et al.

(10) Patent No.: US 6,960,875 B2
(45) Date of Patent: Nov. 1, 2005

(54) GLASS CRACK PREVENTION FILM-LIKE LAYER AND PLASMA DISPLAY DEVICE

(75) Inventors: Yuuichi Morimoto, Osaka (JP); Kazuhiko Miyauchi, Osaka (JP); Yoshihiro Hieda, Osaka (JP); Yukiko Azumi, Osaka (JP); Toshitaka Nakamura, Osaka (JP)

(73) Assignee: Nitto Denko Corporation, Ibaraki (JP)

(*) Notice: Subject to any disclaimer, the term of this patent is extended or adjusted under 35 U.S.C. 154(b) by 2 days.

(21) Appl. No.: 10/145,119

(22) Filed: May 15, 2002

(65) Prior Publication Data

US 2003/0006704 A1 Jan. 9, 2003

(30) Foreign Application Priority Data

May 16, 2001 (JP) .................................... P2001-145913

(51) Int. Cl.[7] .................................................. B32B 7/00

(52) U.S. Cl. ....................... 313/489; 313/110; 313/635; 428/426

(58) Field of Search ................................ 428/426, 428, 428/429, 430, 446, 447, 480, 482, 688, 689, 694 DE, 694 AH, 694 PR, 694 TF, 694 BF, 917, 690; 442/16, 131, 123; 313/483, 484, 489, 513, 514, 110, 111, 567, 582, 635, 636; 315/169.3

(56) References Cited

U.S. PATENT DOCUMENTS 4,585,693 A * 4/1986 DeBergalis et al. ......... 428/324
6,090,473 A 7/2000 Yoshikawa et al.
6,103,640 A 8/2000 Yoshikawa et al.
6,150,754 A 11/2000 Yoshikawa et al.
6,333,592 B1 * 12/2001 Sasa et al. .................. 313/110
6,369,773 B2 * 4/2002 Kashiwagi et al. ......... 343/873
6,515,811 B2 * 2/2003 Ikuhara et al. .............. 313/489
6,597,525 B2 * 7/2003 Kubota ....................... 313/582
2002/0018163 A1 * 2/2002 Yamamoto et al. ......... 349/122
2003/0176124 A1 * 9/2003 Koike et al. ................ 428/447

FOREIGN PATENT DOCUMENTS

CN 2250927 Y 4/1997
JP 9-259770 10/1997
JP 2000-98131 A * 4/2000
JP 2000-265133 9/2000

OTHER PUBLICATIONS

Chinese Office Action dated Dec. 24, 2004, with partial English Translation.
Taiwanese Office Action dated Nov. 8, 2004.

* cited by examiner

*Primary Examiner*—Nimeshkumar D. Patel
*Assistant Examiner*—Sharlene Leurig
(74) *Attorney, Agent, or Firm*—McGinn & Gibb, PLLC

(57) ABSTRACT

A glass crack prevention film-like layer having a glass crack prevention layer exhibiting a dynamic elastic modulus of not larger than $6\times10^6$ Pa at 20° C., and an anti-reflection film laminated on one surface of the glass crack prevention layer, while the other surface of the glass crack prevention layer is provided as an adhesive face. A plasma display device having a plasma display panel, and a glass crack prevention film-like layer defined above and directly attached to a visual side of the plasma display panel through the adhesive face of the glass crack prevention layer contained in the glass crack prevention film-like layer.

23 Claims, 2 Drawing Sheets

GLASS CRACK PREVENTION FILM-LIKE LAYER AND PLASMA DISPLAY DEVICE

The present application is based on Japanese Patent Application No. 2001-145913, which is incorporated herein by reference.

BACKGROUND OF THE INVENTION

1. Field of the Invention

The present invention relates to a glass crack prevention film-like layer and a plasma display device using the glass crack prevention film-like layer.

2. Description of the Related Art

As shown in FIG. 3, a related-art plasma display device includes a plasma display panel 31, a spacer 32, a transparent front panel 33, and a housing 34. The transparent front panel 33 is made of a glass substrate about 3 mm thick and disposed on a visual side of the plasma display panel 31 through a gap 320 formed by the spacer 32. The housing 34 receives the plasma display panel 31, the spacer 32 and the transparent front panel 33 therein. Because the transparent front panel 33 is disposed through the gap 320 in this manner, external impact force can be prevented from acting directly on the plasma display panel 31 and heat generated in the plasma display panel 31 can be restrained from being transmitted to the transparent front panel 33.

There is, however, a problem that an image is doubled because of refraction of light in the interfaces between an air layer made up of the gap 320 and the plasma display panel 31 and between the air layer and the transparent front panel 33. There is also another problem that the plasma display device becomes heavy in weight and high in cost because the transparent front panel 33 needs to have a thickness of about 3 mm to endure external impact force.

On the other hand, the prevent applicant has already proposed, in Unexamined Japanese Patent Publication No. Hei. 9-259770, a plasma display device including a plasma display panel, and a transparent protective substrate directly attached to a visual side of the plasma display panel through a heat-resistant transparent sheet with cushioning properties and firmly sticking properties. In the proposed display device, an excellent effect that the double image problem can be avoided is fulfilled because no air layer as shown in the related art is disposed on the visual side.

In this proposal, it is however difficult to attach the transparent protective substrate to the plasma display panel through a transparent sheet because a hard and thick glass or acrylic substrate is used as the transparent protective substrate. When a glass substrate is used as the transparent protective substrate, a problem in weight and cost of the glass substrate still remains unsolved. Moreover, it cannot be said safely that the proposal is sufficient in terms of shock resistance, because shock resistance is roughly judged by impact force (about 0.0294 J) given when a steel ball 3 g in weight is dropped from a height of 1 m. There is a further problem that the transparent protective substrate cannot be removed easily even in the case where the transparent protective substrate needs to be removed for recycling when the display device is disposed of.

SUMMARY OF THE INVENTION

Under such circumstances, an object of the present invention is to provide a glass crack prevention film-like layer which can be attached to a visual side of a plasma display panel directly without interposition of any air layer and in which the double image problem can be avoided while the attachment of the filter can be made easily to contribute to reduction in weight, thickness and cost, so that the filter exhibits a great glass crack prevention effect for the plasma display panel.

Another object of the invention is to provide a glass crack prevention film-like layer which can be removed easily for recycling after the filter has been attached to the plasma display panel.

A further object of the invention is to provide a plasma display device having a plasma display panel, and a film-like filter defined above and attached to the plasma display panel.

To achieve the foregoing objects, the prevent inventors have made eager examination. As a result, the following fact has been found. That is, in a film-like filter having a specific glass crack prevention layer with a limited dynamic elastic modulus, an anti-reflection film is laminated on one surface of the glass crack prevention layer while the other surface of the glass crack prevention layer is provided as an adhesive face. The filter can be attached to a plasma display panel directly through the adhesive face of the glass crack prevention layer. Hence, the shock resistance of the display device is improved, so that the glass crack prevention effect is enhanced. Moreover, the double image problem caused by an air layer can be solved because the filter is directly attached to the display panel. Moreover, the attachment of the filter is sufficiently easy to contribute to reduction in weight, thickness and cost of the display device because any hard and thick transparent protective substrate such as a glass or acrylic substrate is not used. In addition, when the adhesive face is formed to have removability, the filter can be removed easily because the filter can be removed after the filter has been attached to the display panel. On the basis of the knowledge, the invention has been accordingly achieved.

That is, the invention relates to a glass crack prevention film-like layer having a glass crack prevention layer exhibiting a dynamic elastic modulus of not larger than $6\times10^6$ Pa at 20° C., and an anti-reflection film which is laminated on one surface of the glass crack prevention layer while the other surface of the glass crack prevention layer is provided as an adhesive face. Particularly, it relates to a glass crack prevention film-like layer configured as described above, wherein the glass crack prevention layer has a thickness in a range of from 0.5 to 5 mm. Particularly, it also relates to a glass crack prevention film-like layer configured as described above, wherein the adhesive face of the glass crack prevention layer is removable.

Further, the invention relates to a plasma display device including a plasma display panel, and a glass crack prevention film-like layer configured as described above and directly attached to a visual side of the plasma display panel through the adhesive face of the glass crack prevention layer contained in the glass crack prevention film-like layer.

DETAILED DESCRIPTION OF THE PREFERRED EMBODIMENTS

An embodiment of the invention will be described below with reference to the drawings.

Figure 1:
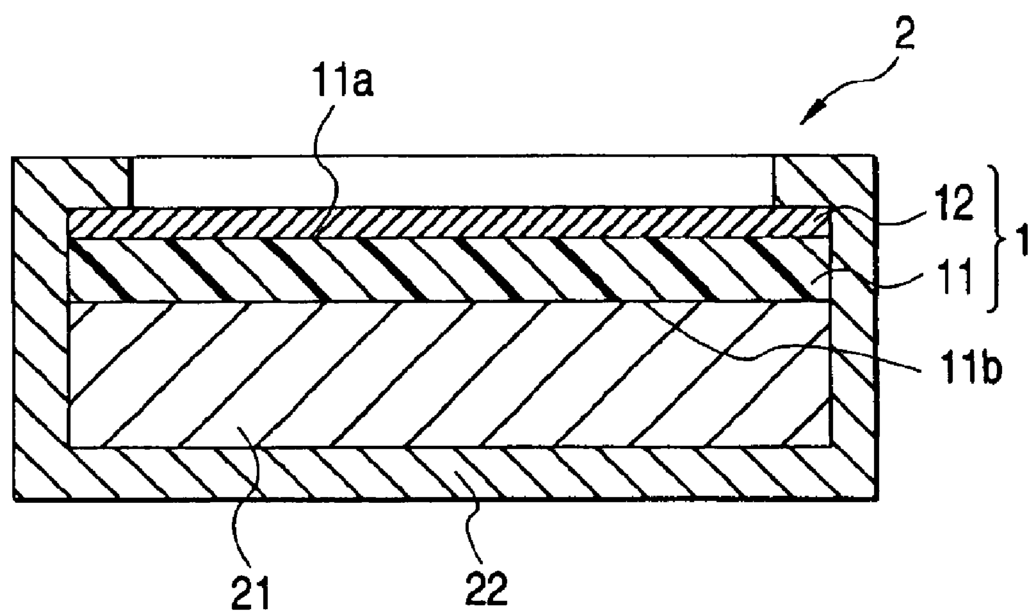
FIG. 1 is a sectional view showing an example of a glass crack prevention film-like layer according to the invention and a plasma display device using the glass crack prevention film-like layer.

FIG. 1 shows an example of a glass crack prevention film-like layer according to the invention and a plasma display device using the film-like filter.

In FIG. 1, the glass crack prevention film-like layer 1 includes a glass crack prevention layer 11, and an anti-reflection film 12 which is laminated on one surface (first surface) 11*a* of the glass crack prevention layer 11 while the other surface (second surface) 11*b* of the glass crack prevention layer 11 is provided as an adhesive face. Further, the plasma display device 2 includes a plasma display panel 21, a glass crack prevention film-like layer 1 defined above, and a housing 22. The glass crack prevention film-like layer 1 is stuck onto a visual side of the plasma display panel 21 directly through the adhesive face of the glass crack prevention layer 11, that is, attached to a visual side of the plasma display panel 21 directly through the adhesive face of the glass crack prevention layer 11. The housing 22 receives the plasma display panel 21 and the glass crack prevention film-like layer 1 therein.

In the glass crack prevention film-like layer 1, it is necessary that the glass crack prevention layer 11 exhibits a dynamic elastic modulus of not larger than $6\times10^6$ Pa at 20° C., preferably not larger than $1\times10^5$ Pa (but generally not smaller than $1\times10^3$ Pa) while it is a matter of course that the glass crack prevention layer 11 has sufficiently good transparency (light transmittance) to utilize the visibility of the plasma display panel 21. When the glass crack prevention layer 11 has such a dynamic elastic modulus, the glass crack prevention layer 11 absorbs and relaxes external impact well to thereby effectively prevent glass of the plasma display panel 21 from being broken.

The thickness of the glass crack prevention layer 11 is preferably selected to be in a range of from 0.5 to 5 mm, especially in a range of from 1 to 3 mm. If the glass crack prevention layer 11 is thinner than 0.5 mm, its impact relaxing ability is lowered. As a result, the glass crack prevention effect for the plasma display panel 21 is spoiled so that a problem may often arise in terms of safety. If the glass crack prevention layer 11 is thicker than 5 mm, the operation of sticking the glass crack prevention film-like layer 1 onto the plasma display panel 21, that is, the attachment operation is spoiled or the visibility of the plasma display panel 21 is lowered. As a result, fluctuation of image or lowering of sharpness may often occur.

The glass crack prevention layer 11 has one surface 11*a* on which the anti-reflection film 12 is laminated, and the other surface 11*b* provided as an adhesive face opposite to the surface 11*a*. Hence, the glass crack prevention film-like layer 1 can be stuck onto the visual side of the plasma display panel 21 easily by use of the adhesion of the adhesive face. The adhesion is preferably selected to be not lower than 0.5 N/25 mm width, especially not lower than 1 N/25 mm width, in terms of 90° peel adhesion. It is also preferable that the adhesive face is removable so that the glass crack prevention film-like layer 1 can be removed easily for recycling after stuck on to the plasma display panel 21. The removability is preferably selected to be not higher than 10 N/25 mm width, especially not higher than 8 N/25 mm width, in terms of 90° peel adhesion obtained after the adhesive face is left at 80° C. for 40 days.

The glass crack prevention layer 11 having such characteristic can be formed as a single-layer structure by use of a pressure sensitive adhesive having the adhesion. Any material having the dynamic elastic modulus can be used as the pressure sensitive adhesive. Especially, an acrylic pressure sensitive adhesive is preferred because the material is excellent in transparency and free from an environmental problem and has physical properties adjusted easily by denaturation.

The “acrylic pressure sensitive adhesive” means an acrylic polymer which may contain suitable additives as occasion demands. The acrylic polymer can be obtained by polymerization of (meth)acrylic alkyl ester as a main component and a modifier monomer copolymerizable therewith and added in accordance with necessity for the purpose of modifying physical properties such as optical characteristic, heat resistance, etc. on the basis of an ordinary method. If necessary, the acrylic polymer may be subjected to a suitable crosslinking process for the purpose of adjusting the adhesion (removability) and heat resistance of the acrylic polymer.

Straight-chain or branch (meth)acrylic alkyl ester having an alkyl group containing 1 to 18 carbon atoms, preferably 4 to 12 carbon atoms is used as the (meth)acrylic alkyl ester. Specific examples of the (meth)acrylic alkyl ester include butyl (meth)acrylate, isobutyl (meth)acrylate, hexyl (meth) acrylate, 2-ethylhexyl (meth)acrylate, isooctyl (meth) acrylate, isononyl (meth)acrylate, and allyl (meth)acrylate.

Examples of the modifier monomer include: amide monomer such as (meth)acrylamide, and N,N-dimethyl (meth) acrylamide; aminoalkyl (meth)acrylate monomer such as aminoethyl (meth)acrylate, and N,N-dimethyl aminoethyl (meth)acrylate; vinyl monomer such as vinyl acetate, and styrene; and cyanoacrylate monomer such as acrylonitrile.

These monomers can be polymerized by a suitable method, such as a solution polymerization method, an emulsion polymerization method or a bulk polymerization method, using a suitable polymerization initiator. When the acrylic polymer obtained is used for forming a glass crack prevention layer 11 relatively thick as described above, it is important that air bubbles are not contained in the layer. It is therefore preferable that the polymerization is performed by a solution polymerization method or a bulk polymerization method.

In the solution polymerization method, an external crosslinker such as an isocyanate crosslinker may be mixed with the obtained organic solvent solution of the acrylic polymer to prepare a pressure sensitive adhesive as occasion demands. This material is applied onto a separator and dried to thereby form a relatively thin material layer. Material layers formed in this manner are laminated to thereby form a single-layer (homogeneous material) structure. In this manner, a relatively thick glass crack prevention layer 11 containing no air bubble can be formed.

In the bulk polymerization method, a photopolymerization initiator may be added to the monomer. The monomer is irradiated with radiant rays such as ultraviolet rays so as to be partially polymerized. A photopolymerization initiator and, generally, a multifunctional monomer as an internal crosslinker are added to the polymer-monomer mixture thus obtained. The mixture is applied onto a separator to form a predetermined thickness. Then, the mixture is irradiated with radiant rays such as ultraviolet rays so as to be perfectly polymerized. In this manner, a relatively thick glass crack prevention layer 11 containing no air bubble can be formed as a single-layer structure.

Examples of the photo-polymerization initiator include: acetophenone compounds such as 4-(2-hydroxyethoxy)phenyl(2-hydroxy-2-propyl)ketone, α-hydroxy-α,α'-dimethylacetophenone, methoxyacetophenone, 2,2-diethoxyacetophenone, 1-hydroxycyclohexylphenylketone, and 2-methyl-1-[4-(methylthio)-phenyl]-2-morpholinopropane-1; benzoin ether compounds such as benzoin-ethyl ether, benzoin-isopropyl ether, and anizoin-methyl ether; α-ketol compounds such as 2-methyl-2-hydroxypropiophenone; ketal compounds such as benzyldimethylketal; aromatic sulfonyl chloride compounds such as 2-naphthalenesulfonyl chloride; light-activated oxime compounds such as 1-phenone-1,1-propanedione-2-(o-ethoxycarbonyl)oxime; and benzophenone compounds such as benzophenone, benzoyl benzoate, and 3,3'-dimethyl-4-methoxybenzophenone.

Examples of the multifunctional monomer as an internal crosslinker include hexanediol di(meth)acrylate, (poly) ethylene glycol di(meth)acrylate, (poly)propylene glycol di(meth)acrylate, pentaerythritol di(meth)acrylate, trimethylolpropane tri(meth)acrylate, pentaerythritol tri(meth) acrylate, dipentaerythritol hexa(meth)acrylate, epoxy (meth) acrylate, polyester (meth)acrylate, and urethane (meth) acrylate.

Although the description has been made upon the case where the glass crack prevention layer 11 is provided as a single-layer structure made of the pressure sensitive adhesive, the invention may be applied also to the case where the glass crack prevention layer 11 is formed as a multilayer structure made of a laminate of a layer of the pressure sensitive adhesive as a base layer and another adhesive layer having removability. In this case, the anti-reflection film 12 is laminated on the base layer side whereas the removable adhesive layer side is stuck onto the visual side of the plasma display panel 21.

Alternatively, another multilayer structure may be formed as follows. The base layer of the pressure sensitive adhesive is replaced by a base layer of a non-pressure sensitive adhesive having impact relaxing properties, so that an adhesive layer is laminated on one surface of the base layer while a removable adhesive layer is laminated on the other surface of the base layer. A multilayer structure laminated in this manner can be formed. In this case, the anti-reflection film 12 is laminated on one surface of the base layer of the glass crack prevention layer 11 through the adhesive layer while the removable adhesive layer disposed on the other surface of the base layer of the glass crack prevention layer 11 is stuck onto the visual side of the plasma display panel 21.

In each of these multilayer structures, the adhesive layer or removable adhesive layer laminated on the base layer is made of the same pressure sensitive adhesive exhibiting a dynamic elastic modulus of not larger than $6\times10^6$ Pa at 20° C., as listed above. A pressure sensitive adhesive having adhesion and removability equivalent to those of the material listed above is preferably used. When the base layer is constituted by a layer of a non-pressure sensitive adhesive having impact relaxing properties, a material exhibiting a dynamic elastic modulus of not larger than $6\times10^6$ Pa at 20° C., such as a thermoplastic urethane elastomer, a thermoplastic styrene elastomer or a thermoplastic polyester elastomer, can be used preferably as the non-pressure sensitive adhesive. Besides these materials, a vinyl chloride resin or an acrylic resin may be used.

Incidentally, in each of these multilayer structures, the total thickness of the base layer and the removable adhesive layers laminated on the base layer is preferably selected to be in a range of from 0.5 to 5 mm, especially in a range of from 1 to 3 mm, as described above. Although it is generally preferable that each layer exhibits a dynamic elastic modulus of not larger than $6\times10^6$ Pa at 20° C. as described above, the invention may be applied also to the case where any layer exhibits a dynamic elastic modulus exceeding the range so long as the multilayer structure can totally exhibit a dynamic elastic modulus of not larger than $6\times10^6$ Pa.

In the glass crack prevention film-like layer 1, the anti-reflection film 12 is generally laminated on one surface 11*a* of the glass crack prevention layer 11 provided as a single-layer structure or as a multilayer structure, by use of the adhesion of the surface 11*a*. The anti-reflection film 12 fulfills its anti-reflection function for reducing mirror reflection of external light when the filter 1 is directly attached to the visual side of the plasma display panel 21. In this manner, the anti-reflection film 12 prevents image display of the plasma display device from being deteriorated.

To fulfill such an effect, a film having a thickness in a range of from 0.01 to 0.5 mm, especially in a range of from 0.05 to 0.3 mm, is preferably used as the anti-reflection film 12. It is generally preferable to use a finely transparent plastic film such as a polyester film which is subjected to anti-reflection treatment to have visible light reflectance of not higher than 5%, especially not larger than 4%. In addition, the plastic film may be subjected to anti-glare treatment in advance so that the haze value is not larger than 5%.

As an example of the anti-reflection treatment, a low-refractive-index layer with a refractive index lower than 1.50, preferably not higher than 1.45, may be formed. The low-refractive-index layer may be made of an organic material or may be made of an inorganic material. Examples of the organic material include fluorine-containing polymer, partially or wholly fluorinated alkyl ester of (meth)acrylic acid, and fluorine-containing silicone. Examples of the inorganic material include $MgF_2$, $CaF_2$, and $SiO_2$. The thickness of the low-refractive-index layer is selected to be generally not larger than 1 μm, especially not larger than 0.5 μm.

As another example of the anti-reflection treatment, a high-refractive-index layer (or a high-refractive-index anti-glare layer) with a refractive index of not lower than 1.5, preferably not lower than 1.6, may be formed. The high-refractive-index layer may be made of an organic material or may be made of an inorganic material. Examples of the organic material include: a material obtained by polymerization and curing of a material such as urethane (meth) acrylate or polyester (meth)acrylate; and a material obtained by crosslinking and curing of a crosslinkable resin material such as a silicone resin, a melamine resin or an epoxy resin. Examples of the inorganic material include: a material containing indium oxide as a main component, and titanium dioxide as a trace component; $Al_2O_3$; MgO; and $TiO_2$. The thickness of the high-refractive-index layer is generally preferably selected to be not larger than 50 μm, especially not larger than 10 μm.

Incidentally, the anti-reflection film 12 may be provided so that a suitable function is added to the anti-reflection film 12 itself as occasion demands. For example, a function of shielding electromagnetic waves or near-infrared rays (in a wavelength range of from 800 to 1,200 nm) may be added to the anti-reflection film 12 itself. For example, a function of adjusting the color of light in a visible light range by use of a chromatic material such as dye or pigment may be added to the anti-reflection film 12 itself. Alternatively, a functional film having such a function may be produced separately in advance so that the functional film can be disposed directly or indirectly below the anti-reflection film 12.

Figure 2:
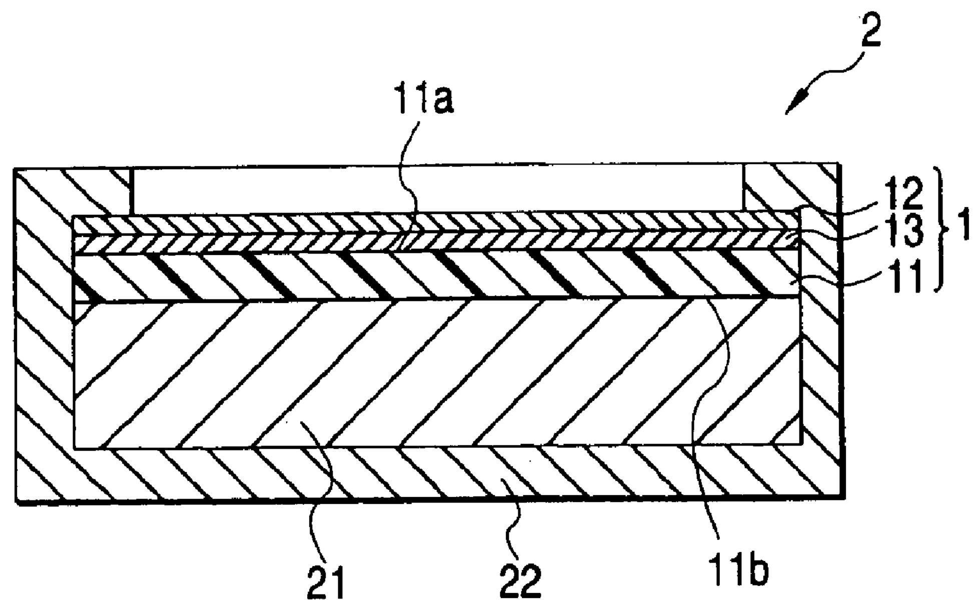
FIG. 2 is a sectional view showing another example of the glass crack prevention film-like layer according to the invention and a plasma display device using the glass crack prevention film-like layer.
Figure 3:
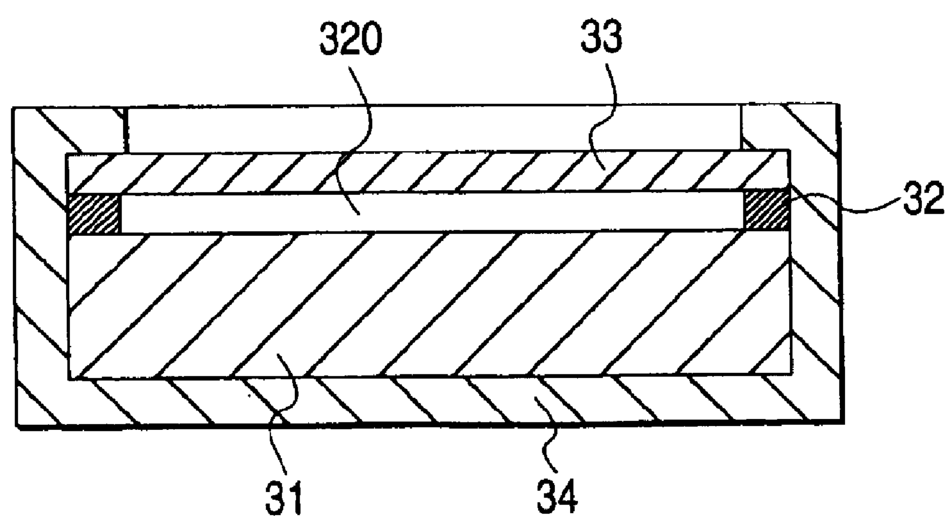
FIG. 3 is a sectional view showing an example of a related-art plasma display device.

FIG. 2 shows an example of the lamination. That is, FIG. 2 shows the case where a functional film 13 having a function of shielding electromagnetic waves and/or near-infrared rays is laminated between the anti-reflection film 12 and the glass crack prevention layer 11 when the anti-reflection film 12 is laminated on one surface 11*a* of the glass crack prevention layer 11. As for the electromagnetic wave shielding function, it is preferable that the shielding effect is not lower than 10 dB, especially not lower than 20 dB. As for the near-infrared ray shielding function, it is preferable that transmittance with respect to near-infrared rays (in a wavelength range of from 800 to 1,200 nm) is not higher than 20%, especially not higher than 10%. Any known film can be widely used as the functional film 13 but the total thickness of the functional film 13 and the anti-reflection film 12 is preferably selected to be in a range of from 0.01 to 0.5 mm, especially in a range of from 0.05 to 0.3 mm so as not to disturb the effect of the invention. Alternatively, the functional film 13 may be disposed below the glass crack prevention layer 11.

In the plasma display device 2, the glass crack prevention film-like layer 1 configured as described above is directly stuck onto the visual side of the plasma display panel 21 constituted by one glass substrate or two glass substrates, by use of the adhesive face which is a surface 11*b* (opposite to one surface 11*a*) of the glass crack prevention layer 11 on which the anti-reflection film 12 (or together with the functional film 13) is laminated, so that the glass crack prevention film-like layer 1 is attached to the plasma display panel 21. When the filter 1 is attached to the display panel 21 in this manner, external impact applied on the display panel 21 is absorbed to and relaxed by the glass crack prevention layer 11 in the filter 1. Hence, glass in the display panel 21 can be effectively prevented from being broken by external impact.

Moreover, the air layer formed in the related art is needless because the filter 1 is directly attached to the plasma display panel 21. Hence, the double image problem caused by the air layer can be eliminated. In addition, the attachment operation is easy enough to make great contribution to reduction in weight, thickness and cost of the display device because the filter 1 is formed to have the relatively thin and light weight anti-reflection film 12 (or together with the functional film 13) laminated therein. In the configuration in which the adhesive face provided as the other surface 11*b* of the glass crack prevention layer 11 in the filter 1 has re-releasablity, there is a further effect that the filter 1 can be removed easily because the filter 1 is removable for recycling when the plasma display device needs to be disposed of.

The invention will be described below more specifically by way of example. Incidentally, the term "parts" in the following description means "parts by weight".

EXAMPLE 1

In a reactor provided with a cooling pipe, a nitrogen gas injection pipe, a thermometer, an ultraviolet light irradiator and a stirrer, 100 parts of 2-ethylhexyl acrylate and 0.1 part of 2,2-dimethoxy-2-phenylacetophenone (photo-polymerization initiator) were put and polymerized by ultraviolet light irradiation to thereby obtain a viscous liquid of a polymer-monomer mixture polymerized by 10% by weight. Into the viscous liquid, 0.2 part of trimethylolpropane triacrylate (internal crosslinker) and 0.1 part of 2,2-dimethoxy-2-phenylacetophenone (photo-polymerization initiator) were added to thereby prepare a photo-polymerizable composition.

The photo-polymerizable composition was applied onto a 50 μm-thick polyester separator and photo-polymerized by irradiation with 2,000 mj/cm$^2$ of ultraviolet rays by an ultraviolet lamp under a nitrogen atmosphere to thereby form a 1 mm-thick base layer of an acrylic pressure sensitive adhesive. The base layer was used as a single-layer structure type glass crack prevention layer so that a 0.1 mm-thick anti-reflection film ("ReaLook A-1200" made by NOF Corp.) was stuck onto one surface of the base layer. Thus, a glass crack prevention film-like layer was produced.

EXAMPLE 2

A glass crack prevention film-like layer was produced in the same manner as in Example 1 except that the coating thickness of the photo-polymerizable composition was changed so that the thickness of the glass crack prevention layer made of the acrylic pressure sensitive adhesive was 2 mm.

EXAMPLE 3

A glass crack prevention film-like layer was produced in the same manner as in Example 1 except that the coating thickness of the photo-polymerizable composition was changed so that the thickness of the glass crack prevention layer made of the acrylic pressure sensitive adhesive was 3 mm.

EXAMPLE 4

In a reactor provided with a cooling pipe, a nitrogen gas injection pipe, a thermometer, an ultraviolet light irradiator and a stirrer, 100 parts of butyl acrylate and 0.1 part of 2,2-dimethoxy-2-phenylacetophenone were put and polymerized by ultraviolet light irradiation to thereby obtain a viscous liquid of a polymer-monomer mixture polymerized by 10% by weight. Into the viscous liquid, 0.2 part of trimethylolpropane triacrylate and 0.1 part of 2,2-dimethoxy-2-phenylacetophenone were added to thereby prepare a photo-polymerizable composition.

The photo-polymerizable composition was applied onto a 50 μm-thick polyester separator and photo-polymerizabled by irradiation with 2,000 mj/cm$^2$ of ultraviolet rays by an ultraviolet lamp under a nitrogen atmosphere to thereby form a 1 mm-thick base layer of an acrylic pressure sensitive adhesive. A 0.1 mm-thick anti-reflection film (obtained in the same manner as in Example 1) was stuck onto one surface of the base layer while a 0.025 mm-thick removable adhesive layer was stuck onto the other surface of the base layer, so that the removable adhesive layer and the base layer constituted a two-layer structure type glass crack prevention layer. Thus, a glass crack prevention film-like layer was produced.

Incidentally, a layer of a pressure sensitive adhesive which contained an acrylic polymer consisting of a monomer composition of isooctyl acrylate and hydroxyethyl acrylate with a ratio of 100:1 (by weight) as a main component and which exhibited a dynamic elastic modulus of $2\times10^4$ Pa at 20° C. in single use was used as the removable adhesive layer.

EXAMPLE 5

In a reactor provided with a cooling pipe, a nitrogen gas injection pipe, a thermometer, an ultraviolet light irradiator and a stirrer, 97 parts of isononyl acrylate, 3 parts of acrylic acid and 0.1 part of 2,2-dimethoxy-2-phenylacetophenone were put and polymerized by ultraviolet light irradiation to thereby obtain a viscous liquid of a polymer-monomer mixture polymerized by 10% by weight. Into the viscous liquid, 0.2 part of trimethylolpropane triacrylate and 0.1 part of 2,2-dimethoxy-2-phenylacetophenone were added to thereby prepare a photo-polymerizable composition.

The photo-polymerizable composition was applied onto a 50 μm-thick polyester separator and photo-polymerized by irradiation with 2,000 mj/cm$^2$ of ultraviolet rays by an ultraviolet lamp under a nitrogen atmosphere to thereby form a 1 mm-thick base layer of an acrylic pressure sensitive adhesive. A 0.1 mm-thick anti-reflection film (obtained in the same manner as in Example 1) was stuck onto one surface of the base layer while a 0.025 mm-thick removable adhesive layer (obtained in the same manner as in Example 4) was stuck onto the other surface of the base layer, so that the removable adhesive layer and the base layer constituted a two-layer structure type glass crack prevention layer. Thus, a glass crack prevention film-like layer was produced.

EXAMPLE 6

In a reactor provided with a cooling pipe, a nitrogen gas injection pipe, a thermometer, an ultraviolet light irradiator and a stirrer, 97 parts of isooctyl acrylate, 3 parts of acrylic acid and 0.1 part of 2,2-dimethoxy-2-phenylacetophenone were put and polymerized by ultraviolet light irradiation to thereby obtain a viscous liquid of a polymer-monomer mixture polymerized by 10% by weight. Into the viscous liquid, 0.2 part of trimethylolpropane triacrylate and 0.1 part of 2,2-dimethoxy-2-phenylacetophenone were added to thereby prepare a photo-polymerizable composition.

The photo-polymerizable composition was applied onto a 50 μm-thick polyester separator and photo-polymerized by irradiation with 2,000 mj/cm$^2$ of ultraviolet rays by an ultraviolet lamp under a nitrogen atmosphere to thereby form a 1 mm-thick base layer of an acrylic pressure sensitive adhesive. The base layer was used as a single-layer structure type glass crack prevention layer so that a 0.1 mm-thick anti-reflection film (obtained in the same manner as in Example 1) was stuck onto one surface of the base layer. Thus, a glass crack prevention film-like layer was produced.

EXAMPLE 7

In a reactor provided with a cooling pipe, a nitrogen gas injection pipe, a thermometer, an ultraviolet light irradiator and a stirrer, 99 parts of butyl acrylate, 1 part of acrylic acid, 1 part of hydroxybutyl acrylate, 0.2 part of azobisisobutylonitrile and ethyl acetate were put and polymerized at 60° C. to thereby obtain a solution containing about 40% by weight of an acrylic polymer. Into the solution, 2 parts of an isocyanate crosslinker were added to thereby prepare a pressure sensitive adhesive.

The pressure sensitive adhesive was applied onto a 50 μm-thick polyester separator to thereby form a 0.05 mm-thick adhesive layer. Then, twenty adhesive layers obtained in the manner were stuck onto one another successively to thereby form a 1 mm-thick base layer of the acrylic pressure sensitive adhesive. A 0.1 mm-thick anti-reflection film (obtained in the same manner as in Example 1) was stuck onto one surface of the base layer while a 0.025 mm-thick removable adhesive layer (obtained in the same manner as in Example 4) was stuck onto the other surface of the base layer, so that the removable adhesive layer and the base layer constituted a two-layer structure type glass crack prevention layer. Thus, a glass crack prevention film-like layer was produced.

EXAMPLE 8

In a reactor provided with a cooling pipe, a nitrogen gas injection pipe, a thermometer, an ultraviolet light irradiator and a stirrer, 100 parts of 2-ethylhexyl acrylate and 0.1 part of 2,2-dimethoxy-2-phenylacetophenone were put and polymerized by ultraviolet light irradiation to thereby obtain a viscous liquid of a polymer-monomer mixture polymerized by 10% by weight. Into the viscous liquid, 35 parts of dioctyl phthalate, 0.2 part of trimethylolpropane triacrylate and 0.1 part of 2,2-dimethoxy-2-phenylacetophenone were added to thereby prepare a photo-polymerizable composition.

The photo-polymerizable composition was applied onto a 50 μm-thick polyester separator and photo-polymerized by irradiation with 2,000 mj/cm$^2$ of ultraviolet rays by an ultraviolet lamp under a nitrogen atmosphere to thereby form a 1 mm-thick base layer of an acrylic pressure sensitive adhesive. The base layer was used as a single-layer structure type glass crack prevention layer so that a 0.1 mm-thick anti-reflection film (obtained in the same manner as in Example 1) was stuck onto one surface of the base layer. Thus, a glass crack prevention film-like layer was produced.

EXAMPLE 9

A thermoplastic urethane elastomer ("E3070A" made by Toyobo Co., Ltd.) was press-molded into a 0.95 mm-thick base layer of a non-pressure sensitive adhesive. A 0.025 mm-thick adhesive layer was stuck onto one surface of the base layer. A 0.1 mm-thick anti-reflection film (obtained in the same manner as in Example 1) was stuck on to the base layer through the adhesive layer. Further, a 0.025 mm-thick removable adhesive layer (obtained in the same manner as in Example 4) was stuck onto the other surface of the base layer.

In this manner, the adhesive layer, the base layer and the removable adhesive layer constituted a three-layer structure type glass crack prevention layer. Thus, a glass crack prevention film-like layer was produced as a structure in which the anti-reflection film was laminated on the glass crack prevention layer.

Incidentally, a layer of a pressure sensitive adhesive which contained an acrylic polymer consisting of a monomer composition of butyl acrylate and acrylic acid with a ratio of 100:5 (by weight) as a main component and which exhibited a dynamic elastic modulus of $2\times10^5$ Pa at 20° C. in single use was used as the adhesive layer provided on the side where the anti-reflection film was laminated.

EXAMPLE 10

A thermoplastic styrene elastomer ("SEPTON 2043" made by Kuraray Co., Ltd.) was press-molded into a 0.85 mm-thick base layer of a non-pressure sensitive adhesive. A 0.025 mm-thick adhesive layer (obtained in the same manner as in Example 9) was stuck onto one surface of the base layer. A 0.1 mm-thick anti-reflection film (obtained in the same manner as in Example 1) was stuck on to the base layer through the adhesive layer. Further, a 0.025 mm-thick removable adhesive layer (obtained in the same manner as in Example 4) was stuck onto the other surface of the base layer.

In this manner, the adhesive layer, the base layer and the removable adhesive layer constituted a three-layer structure type glass crack prevention layer. Thus, a glass crack prevention film-like layer was produced as a structure in which the anti-reflection film was laminated on the glass crack prevention layer.

EXAMPLE 11

A thermoplastic polyester elastomer ("PELPRENE P-30B" made by Toyobo Co., Ltd.) was press-molded into a 0.95 mm-thick base layer of a non-pressure sensitive adhesive. A 0.025 mm-thick adhesive layer (obtained in the same manner as in Example 9) was stuck onto one surface of the base layer. A 0.1 mm-thick anti-reflection film (obtained in the same manner as in Example 1) was stuck on to the base layer through the adhesive layer. Further, a 0.025 mm-thick removable adhesive layer (obtained in the same manner as in Example 4) was stuck onto the other surface of the base layer.

In this manner, the adhesive layer, the base layer and the removable adhesive layer constituted a three-layer structure type glass crack prevention layer. Thus, a glass crack prevention film-like layer was produced as a structure in which the anti-reflection film was laminated on the glass crack prevention layer.

COMPARATIVE EXAMPLE 1

A 0.025 mm-thick removable adhesive layer (obtained in the same manner as in Example 4) was stuck onto a 0.1 mm-thick anti-reflection film (obtained in the same manner as in Example 1) to thereby produce a glass crack prevention film-like layer.

COMPARATIVE EXAMPLE 2

A 1 mm-thick hard acrylic sheet was used as a base layer. A 0.025 mm-thick adhesive layer (obtained in the same manner as in Example 9) was stuck onto one surface of the base layer. A 0.1 mm-thick anti-reflection film (obtained in the same manner as in Example 1) was stuck on to the base layer through the adhesive layer. Further, a 0.025 mm-thick removable adhesive layer (obtained in the same manner as in Example 4) was stuck onto the other surface of the base layer.

In this manner, a glass crack prevention filter was produced as a structure in which the anti-reflection film was laminated on the hard acrylic sheet used as a base layer.

The dynamic elastic modulus, at 20° C., of the base layer (the hard acrylic sheet in Comparative Example 2) constituting the glass crack prevention layer in the filter obtained in each of Examples 1 to 11 and Comparative Examples 1 and 2 was obtained on the basis of temperature dispersion measurement at a frequency of 1 Hz by using a viscoelastic spectrometer (an ARES device made by Rheometric Scientific F. E. Ltd.). Further, shock resistance and 90° peel adhesion (removability) of the filter obtained in each of Examples 1 to 11 and Comparative Examples 1 and 2 were measured by the following method. Results of these measurements were as shown in Table 1.

<Shock Resistance>

A 1 mm-thick silicone sheet and a 2.8 mm-thick plasma display glass substrate ("PD200" made by Asahi Glass Company) were successively put on a metal plate. Then, the (removable) adhesive face of the filter opposite to the side where the anti-reflection film was laminated was pressed against the plasma display glass substrate so that the filter was stuck onto the plasma display glass substrate.

In the condition that a steel ball 50 mm in diameter and 510 g in weight was dropped from a height of 10 cm onto the filter, examination was made as to whether the plasma display glass substrate was broken or not. Evaluation was made as "o" when the glass substrate was not broken was evaluated and as "x" when the glass substrate was broken. Incidentally, impact energy at the time of dropping of the steel ball was about 0.5 J which was a value given by the formula: steel ball weight (Kg)×height (m)×9.8 (m/s$^2$)=0.51×0.1×9.8.

<90° Peel Adhesion>

The filter was cut into a size having a width of 25 mm. The (removable) adhesive face of the filter opposite to the side where the anti-reflection film was laminated was stuck onto a 2.8 mm-thick plasma display glass substrate ("PD200" made by Asahi Glass Company). After left in an 80° C. atmosphere for 40 days, the plasma display glass substrate was taken out. After the plasma display glass substrate was further left at 23° C. for 4 hours, the filter was released at a speed of 50 mm/min in a direction of 90° C. The adhesion of the filter on this occasion was measured.

TABLE 1

| | Dynamic Elastic Modulus at 20° C. (Pa) | Shock Resistance | 90° Peel adhesion (N/25 mm width) |
|---|---|---|---|
| Example 1 | $3 \times 10^4$ | o | 5.0 |
| Example 2 | $3 \times 10^4$ | o | 6.5 |
| Example 3 | $3 \times 10^4$ | o | 8.0 |
| Example 4 | $7 \times 10^4$ | o | 4.9 |
| Example 5 | $5 \times 10^4$ | o | 5.0 |
| Example 6 | $5 \times 10^4$ | o | 5.1 |
| Example 7 | $8 \times 10^4$ | o | 4.9 |
| Example 8 | $1 \times 10^4$ | o | 4.1 |
| Example 9 | $3 \times 10^6$ | o | 4.9 |
| Example 10 | $5 \times 10^6$ | o | 4.7 |
| Example 11 | $7 \times 10^5$ | o | 4.9 |
| Comparative Example 1 | — | x | 2.5 |
| Comparative Example 2 | $3 \times 10^8$ | x | unmeasurable |

It is obvious from these results that the glass crack prevention film-like layer obtained in each of Examples 1 to 11 according to the invention can be easily stuck onto a glass substrate through the adhesive face of the filter and can be easily removed from the glass substrate after the sticking, and that the film-like filter obtained in each of Examples 1 to 11 has a more excellent glass crack prevention effect than the film-like filter obtained in Comparative Example 1 with no glass crack prevention layer as a base layer. On the other hand, in the filter obtained in Comparative Example 2 with a hard acrylic sheet exhibiting a dynamic elastic modulus exceeding the scope of the invention at 20° C. as a base layer, the glass crack prevention effect cannot be obtained sufficiently.

As described above, in accordance with the invention, there is a specific configuration in which a glass crack prevention film-like layer includes a glass crack prevention layer exhibiting a dynamic elastic modulus of not larger than $6\times10^6$ Pa at 20° C., and an anti-reflection film laminated on one surface of the glass crack prevention layer while the other surface of the glass crack prevention layer is provided as an adhesive face. Hence, the glass crack prevention film-like layer can be directly attached to a visual side of a plasma display panel through the adhesive face of the glass crack prevention layer. Hence, shock resistance of a display device is improved and the glass crack prevention effect for the plasma display panel is enhanced. Moreover, the double image problem caused by an air layer is eliminated because of the direct attachment of the filter. Moreover, because it is unnecessary to provide any transparent protective substrate such as a hard and thick glass or acrylic substrate, the invention can contribute to easy attachment and reduction in weight, thickness and cost of the display device. In addition, because the adhesive face is configured to be removable, the glass crack prevention film-like layer can be removed for recycling. In this manner, a glass crack prevention film-like layer easily removable and a plasma display device using the film-like filter can be provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A glass crack prevention film layer, comprising:

a glass crack prevention layer having a thickness in a range from 0.875 mm to 3 mm and exhibiting a dynamic elastic modulus of not larger than $6\times10^6$ Pa at 20° C.; and an anti-reflection film which is laminated on a first surface of said glass crack prevention layer, wherein a second surface of said glass crack prevention layer comprises an adhesive face having an adhesion which is at least 0.5 N/25 mm width in terms of 90° peel adhesion, for adhering to a visual side of a display panel.

2. The glass crack prevention film layer according to claim 1, wherein said glass crack prevention layer comprises a removable adhesive face.

3. The glass crack prevention film layer according to claim 1, wherein the dynamic elastic modulus of said glass crack prevention layer is not larger than $1\times10^5$ Pa at 20° C.

4. The glass crack prevention film layer according to claim 1, wherein said glass crack prevention layer comprises an acrylic pressure sensitive adhesive.

5. A plasma display device, comprising:

a plasma display panel; and the glass crack prevention film layer according to claim 1 laminated to a visual side of said plasma display panel through said adhesive face of said glass crack prevention film.

6. The plasma display device according to claim 5, further comprising:

a functional film including at least one of an electromagnetic wave shielding function and a near-infrared ray shielding function, and being disposed below said anti-reflection film.

7. The plasma display device according to claim 6, wherein said functional film is disposed between said anti-reflection film and said glass crack prevention layer.

8. The glass crack prevention film according to claim 1, wherein said dynamic elastic modulus of said glass crack prevention layer is at least $1\times10^3$ Pa at 20° C.

9. The glass crack prevention film according to claim 1, wherein said anti-reflection film has an operational thickness of 0.05 mm to 0.3 mm.

10. The glass crack prevention film according to claim 1, wherein said anti-reflection film includes a visible light reflectance of not greater than 5%.

11. The glass crack prevention film according to claim 1, wherein said anti-reflection film is directly attached to the glass crack prevention layer.

12. The glass crack prevention film according to claim 1, wherein said anti-reflection film is separated from said glass crack prevention layer by a single film layer of a predetermined thickness.

13. The glass crack prevention film according to claim 1, wherein said adhesion is not greater than 10 N/25 mm width in terms of 90° peel adhesion after said adhesive face is left at 80° C. for 40 days.

14. The plasma display device according to claim 5, wherein said glass crack prevention layer comprises:

a base layer; and a removable adhesive layer which is attached onto said visual side of said plasma display panel.

15. The plasma display device according to claim 5, wherein said anti-reflection film directly contacts said glass crack prevention layer to reflect external light away from said plasma display panel.

16. The plasma display device according to claim 5, wherein said glass crack prevention layer comprises:

a non-pressure sensitive adhesive base layer; and a removable adhesive layer.

17. The plasma display device according to claim 5, wherein said adhesive face comprises a pressure sensitive acrylic polymer polymerized with an isocyanate crosslinker to provide adjustable removability from said plasma display device.

18. The plasma display device according to claim 5, wherein said glass crack prevention layer comprises an adhesive layer, a base layer and a removable adhesive layer, said adhesive layer having a dynamic elastic modulus of approximately $2\times10^5$ Pa at 20° C.

19. The plasma display device according to claim 5, wherein said anti-reflection film comprises a refractive index of at least 1.5.

20. The glass crack prevention film layer according to claim 1, wherein said anti-reflection film comprises a polyester film which has been subjected to an anti-reflection treatment.

21. The glass crack prevention film layer according to claim 1, wherein said glass crack prevention layer is composed entirely of said adhesive layer.

22. A glass crack prevention film, comprising:

an adhesive layer having a thickness in a range from 1 mm to 3 mm and exhibiting a dynamic elastic modulus of not larger than $6\times10^6$ Pa at 20° C.; and an anti-reflection film which is laminated on a surface of said adhesive layer, wherein said adhesive layer comprises an adhesion which is at least 0.5 N/25 mm width in terms of 90° peel adhesion.

23. A display device comprising:

a plasma display panel; and a glass crack prevention film formed on said plasma display panel, comprising:

an adhesive layer having a thickness in a range from 1 mm to 3 mm and exhibiting a dynamic elastic modulus of not larger than $6\times10^6$ Pa at 20° C.; and an anti-reflection film which is laminated on a surface of said adhesive layer, wherein said adhesive layer comprises an adhesion which is at least 0.5 N/25 mm width in terms of 90° peel adhesion.

* * * * *